United States Patent
Guan et al.

(10) Patent No.: US 10,503,061 B2
(45) Date of Patent: Dec. 10, 2019

(54) FOCUSING METHOD OF OPTICAL MACHINE OF PROJECTOR, FOCUSING DEVICE AND OPTICAL MACHINE

(71) Applicant: BOE TECHNOLOGY GROUP CO., LTD., Beijing (CN)

(72) Inventors: Hongtao Guan, Beijing (CN); Wenchu Dong, Beijing (CN); Junwei Yan, Beijing (CN); Ying Zhang, Beijing (CN); Tailiang Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/993,994

(22) Filed: May 31, 2018

(65) Prior Publication Data

US 2019/0025689 A1   Jan. 24, 2019

(30) Foreign Application Priority Data

Jul. 21, 2017   (CN) .......................... 2017 1 0599349

(51) Int. Cl.
*G03B 21/53*   (2006.01)
*G02B 7/28*   (2006.01)
(Continued)

(52) U.S. Cl.
CPC ............. *G03B 21/53* (2013.01); *G02B 7/028* (2013.01); *G02B 7/08* (2013.01); *G02B 7/28* (2013.01)

(58) Field of Classification Search
CPC ........ G02B 7/008; G02B 7/028; G02B 7/185; G02B 3/14; G02B 13/14; G02B 3/12;
(Continued)

(56) References Cited

U.S. PATENT DOCUMENTS

| 5,269,292 A * | 12/1993 | Granz ................ A61B 17/2258 367/150 |
| 2008/0231818 A1* | 9/2008 | Shinozaki .............. G03B 21/53 353/101 |

(Continued)

FOREIGN PATENT DOCUMENTS

| CN | 204305200 U | 4/2015 |
| CN | 205485239 U | 8/2016 |

OTHER PUBLICATIONS

Office Action dated Apr. 11, 2019 issued in corresponding Chinese Application No. 201710599349.5.

*Primary Examiner* — Cara E Rakowski
*Assistant Examiner* — Christopher A Lamb, II
(74) *Attorney, Agent, or Firm* — Nath, Goldberg & Meyer; Joshua B. Goldberg

(57) ABSTRACT

The disclosure provides a focusing method of optical machine of projector, a focusing device and an optical machine. The focusing method comprises steps of: detecting deformation amount of lens of an optical machine; and controlling and adjusting a focal length of the lens of the optical machine according to the deformation amount of the lens of the optical machine. In the he focusing method, by detecting the deformation amount of the lens of the optical machine in real time and controlling to adjust the focal length of the lens of the optical machine in real time according to the deformation amount of the lens of the optical machine, the adjustment precision of the focal length of the lens of the optical machine can be greatly improved.

7 Claims, 2 Drawing Sheets

(51) Int. Cl.
*G02B 7/02* (2006.01)
*G02B 7/08* (2006.01)

(58) Field of Classification Search
CPC . G02B 7/181; G02B 7/28; G02B 7/04; G02B 7/09; G03B 21/53; G03B 13/36
See application file for complete search history.

(56) References Cited

U.S. PATENT DOCUMENTS

| | | | |
|---|---|---|---|
| 2008/0239450 A1* | 10/2008 | Immink | G02B 3/14 359/254 |
| 2014/0268361 A1* | 9/2014 | Nunnink | G02B 7/08 359/665 |
| 2018/0149826 A1* | 5/2018 | Lei | G02B 5/32 |

* cited by examiner

FOCUSING METHOD OF OPTICAL MACHINE OF PROJECTOR, FOCUSING DEVICE AND OPTICAL MACHINE

CROSS-REFERENCE TO RELATED APPLICATION

This application claims the benefit of China Patent Application No. 201710599349.5, filed on Jul. 21, 2017, titled "FOCUSING METHOD OF OPTICAL MACHINE OF PROJECTOR, FOCUSING DEVICE AND OPTICAL MACHINE", which is hereby incorporated by reference herein in its entirety.

FIELD

The present disclosure relates to the field of projection technologies, and in particular, to a focusing method of optical machine of projector, a focusing device and an optical machine.

BACKGROUND

Recently, with the rapid development of smart projection technologies, projection systems with excellent picture quality have rapidly gained a large share of the market. Here, the projection system, also known as a projector, refers to a device that projects images, text, or video onto a curtain or a wall.

The projection system is mainly realized by an "Optical Machine". The light source of the optical machine mainly comes from incandescent lamps, LED lights, and lasers. No matter what kind of light source is utilized, however, a lot of heat may be emitted in the process of generating light. The lens of the optical machine is more prone to thermal expansion and contraction, and thus a slight deformation thereof may occur. As a result, the lens of the optical machine may lose focus if it operates for a long-term. If the lens of the optical machine operates out of focus, an image presented on a screen may be blurred. At this point, it is necessary to adjust a focal length of projection again so that the image becomes clear.

At present, in order to reduce the deformation of the lens of the optical machine caused by the thermal expansion and contraction, a shell of an all-metal structure and a full-glass lens instead of a resin lens are generally used in a high-end projector. Although this is beneficial to the heat dissipation of the lens of the optical machine to reduce the deformation thereof, the cost of the projection system will be greatly increased.

SUMMARY

For the above-mentioned technical problems in the prior art, the present disclosure provides a focusing method of optical machine of projector, a focusing device and an optical machine.

An embodiment of the disclosure provides a focusing method of an optical machine of a projector comprises steps of: detecting deformation amount of lens of an optical machine; and controlling and adjusting a focal length of the lens of the optical machine according to the deformation amount of the lens of the optical machine.

Optionally, the step of detecting deformation amount of lens of an optical machine comprises: mounting a deformation sensor on the lens of the optical machine; detecting, by the deformation sensor, a first deformation amount of the lens of the optical machine as a function of temperature; detecting a second deformation amount of the deformation sensor as a function of temperature; and calculating the deformation amount of the lens of the optical machine according to the first deformation amount and the second deformation amount.

Optionally, the step of detecting deformation amount of lens of an optical machine comprises: mounting a deformation sensor on the lens of the optical machine; and detecting, by the deformation sensor, the deformation amount of the lens of the optical machine as a function of temperature.

Optionally, the step of detecting a second deformation amount of the deformation sensor as a function of temperature comprises: mounting a temperature sensor on the lens of the optical machine; detecting, by the temperature sensor, a temperature change of the deformation sensor; and determining the second deformation amount of the deformation sensor based on the temperature change.

Optionally, the deformation sensor includes a piezoelectric film sensor and the temperature sensor includes a thermocouple sensor.

An embodiment of the disclosure provides a focusing device, comprising a detection circuit, a control circuit, and a focusing circuit, wherein the detection circuit is configured to detect a deformation amount of lens of an optical machine; the control circuit is configured to control the focusing circuit to adjust a focal length of the lens of the optical machine according to the deformation amount of the lens of optical machine; and the focusing circuit is configured to adjust the focal length of the lens of optical machine.

Optionally, the detection circuit comprises a deformation sensor disposed on the lens of the optical machine, a first detection sub-circuit disposed on the lens of the optical machine, and a calculation sub-circuit, wherein the deformation sensor is configured to detect a first deformation amount of the lens of optical machine as a function of temperature; the first detection sub-circuit is configured to detect a second deformation amount of the deformation sensor as a function of temperature; and the calculation sub-circuit is configured to calculate the deformation amount of the lens of optical machine according to the first deformation amount and the second deformation amount, wherein the deformation amount of the lens of optical machine is equal to the first deformation amount minus the second deformation amount.

Optionally, the detection circuit comprises a deformation sensor disposed on the lens of optical machine for detecting the deformation amount of the lens of optical machine as a function of temperature.

Optionally, the deformation sensor includes a piezoelectric film sensor; the first detection sub-circuit includes a temperature sensor and the temperature sensor includes a thermocouple sensor; and the focusing circuit includes a focusing motor that adjusts the focal length of the lens of the optical machine by adjusting a rotational direction and a rotational speed of the focusing motor.

An embodiment of the disclosure provides an optical machine comprising the focusing device as set forth above.

DETAILED DESCRIPTION OF THE EMBODIMENTS

In order to better understand the technical solutions of the present disclosure by those skilled in the art, the focusing method of the optical machine of the projector, a focusing device and the optical machine according to embodiments of the present disclosure will be further described in detail below with reference to the accompanying drawings and specific implementation manners.

Figure 1:
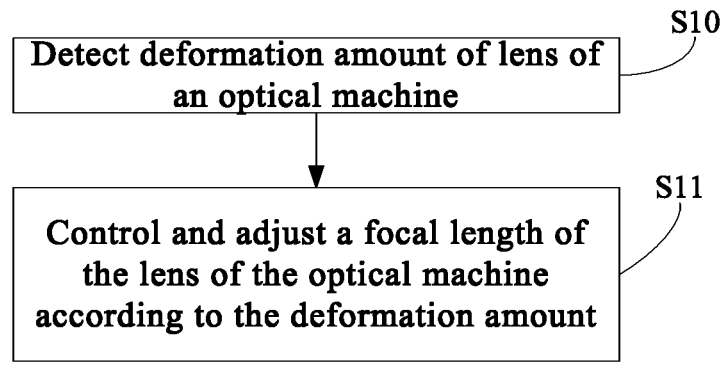
FIG. 1 is a flowchart of a focusing method of an optical machine of a projector according to an embodiment of the present disclosure.
Figure 2:
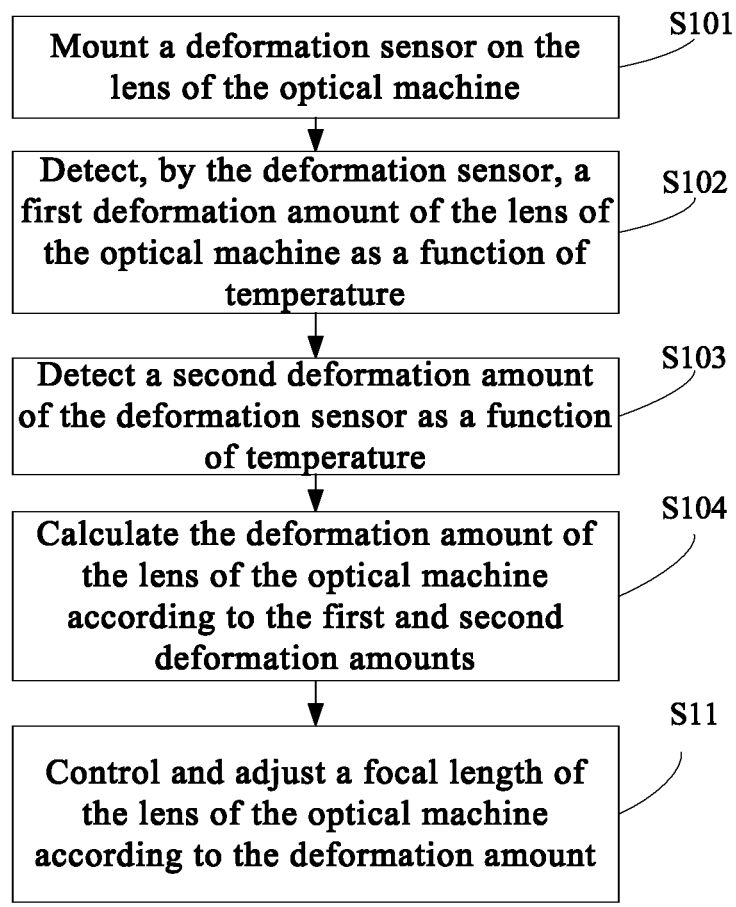
FIG. 2 is a specific flowchart of the focusing method of the optical machine of the projector according to an embodiment of the present disclosure.

A focusing method of an optical machine of a projector according to an embodiment of the present disclosure, as shown in FIG. 1 and FIG. 2, comprises:

Step S10: detecting deformation amount of lens of an optical machine; and

Step S11, controlling and adjusting a focal length of the lens of the optical machine according to the deformation amount of the lens of the optical machine.

In the he focusing method, by detecting the deformation amount of the lens of the optical machine in real time and controlling to adjust the focal length of the lens of the optical machine in real time according to the deformation amount of the lens of the optical machine, the adjustment precision of the focal length of the lens of the optical machine can be greatly improved. Therefore, it is possible to significantly reduce the defocusing of the lens of the optical machine due to the deformation of the lens of the optical machine caused by the thermal expansion and contraction, and further improve the projection resolution of the optical machine of the projector. At the same time, since the housing and lens material of the optical machine of the projector are not changed, the material cost of the optical machine of the projector can also be reduced by the focusing method according to the embodiment of the present disclosure.

According to an exemplary embodiment, Step S10 may specifically comprise:

Step S101: mounting a deformation sensor on the lens of the optical machine;

Step S102: detecting, by the deformation sensor, a first deformation amount of the lens of the optical machine as a function of temperature;

Step S103: detecting a second deformation amount of the deformation sensor as a function of temperature; and Step S104: calculating the deformation amount of the lens of the optical machine according to the first deformation amount and the second deformation amount.

At Step S101, the deformation sensor is usually attached to the light exit surface of the lens of the optical machine. Since the deformation of the light exit surface is relatively obvious with the lens of the optical machine, it is possible to more precisely reflect the deformation of the lens of the optical machine. Therefore, the arrangement of the deformation sensor on the light exit surface can more accurately detect the deformation of the lens of the optical machine, so that the focusing length of the lens of the optical machine can be adjusted more accurately.

In this embodiment, a piezoelectric film sensor may be used as the deformation sensor. The piezoelectric film sensor having an excellent light transmission performance is attached to the light exit surface of the lens of the optical machine, without affecting the light transmission of the lens of the optical machine. At the same time, the piezoelectric film sensor can be deformed along with the deformation of the lens of the optical machine. Thus, it is possible to accurately detect the deformation of the lens of the optical machine and convert the detected deformation into a voltage signal output, which can advantageously control the focusing adjustment according to the voltage signal by a control system.

At Step S103, the second deformation amount is a deformation amount of the deformation sensor itself with change in the temperature.

Step 103 may specifically include: detecting, by a temperature sensor, a temperature change of the deformation sensor; and determining the second deformation amount of the deformation sensor based on the temperature change.

Here, the temperature sensor is disposed on a side of the lens of the optical machine. Therefore, the temperature sensor does not affect the normal light transmission of the lens of the optical machine, and at the same time, it can accurately detect the temperature where the lens of the optical machine is positioned (that is, the temperature of the deformation sensor). Since the deformation sensor itself will be deformed to a certain degree with changes in temperature and the deformation sensor has an experimentally determined temperature-deformation variation curve which has been configured in a factory, the deformation amount of the deformation sensor itself (i.e., the second deformation amount) can be obtained from the curve and the temperature measured by the temperature sensor.

In this embodiment, the temperature sensor includes a thermocouple sensor.

Here, the deformation amount of the lens of optical machine is equal to the first deformation amount minus the second deformation amount. Through Step 104, the deformation amount of the deformation sensor itself can be compensated during the detection of the deformation amount of the lens of the optical machine. Therefore, the deformation amount of the lens of optical machine obtained through the calculation can become more accurate, so that the focusing adjustment can be more accurate.

Figure 3:
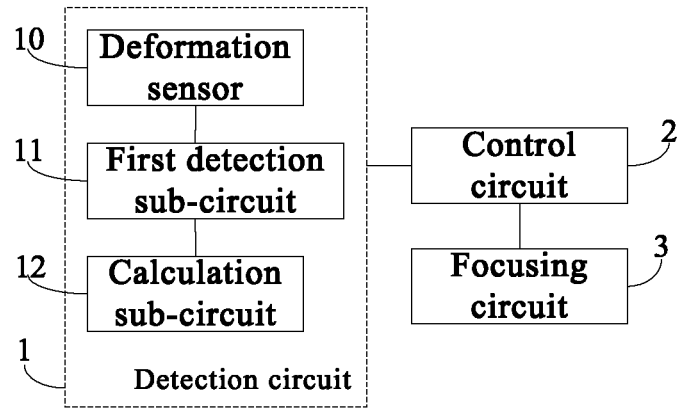
FIG. 3 is a block diagram of a focusing device of an optical machine of a projector according to an embodiment of the present disclosure.

An embodiment of the present disclosure also provides a focusing device, as shown in FIG. 3, including: a detection circuit 1, a control circuit 2, and a focusing circuit 3. The detection circuit 1 may be configured to detect a deformation amount of lens of an optical machine. The control circuit 2 may be configured to control the focusing circuit 3 to adjust a focal length of the lens of the optical machine according to the deformation amount of the lens of optical machine. The focusing circuit 3 can be configured to adjust the focal length of the lens of optical machine.

In an exemplary embodiment, the detection circuit 1 may include a deformation sensor 10, a first detection sub-circuit 11 and a calculation sub-circuit 12. The deformation sensor 10 and the first detection sub-circuit 11 are both disposed on the lens of optical machine. The deformation sensor 10 may be configured to detect a first deformation amount of the lens of optical machine as a function of temperature. The first detection sub-circuit 11 may be configured to detect a second deformation amount of the deformation sensor 10 as a function of temperature. The calculation sub-circuit 12 may be configured to calculate the deformation amount of the lens of optical machine according to the first deformation amount and the second deformation amount. Here, the deformation amount of the lens of optical machine=the first deformation amount−second deformation amount. The arrangement of the deformation sensor 10, the first detection sub-circuit 11 and the calculation sub-circuit 12 can compensate the deformation amount of the deformation sensor itself during the detection of the deformation amount of the lens of the optical machine. Therefore, the deformation amount of the lens of optical machine obtained through the calculation can become more accurate, so that the focusing adjustment can be more accurate.

In this embodiment, the deformation sensor 10 includes a piezoelectric film sensor. The first detection sub-circuit 11 includes a temperature sensor, and the temperature sensor includes a thermocouple sensor. The focusing circuit 3 includes a focusing motor that adjusts the focal length of the lens of the optical machine by adjusting its rotational direction and rotational speed.

Figure 4:
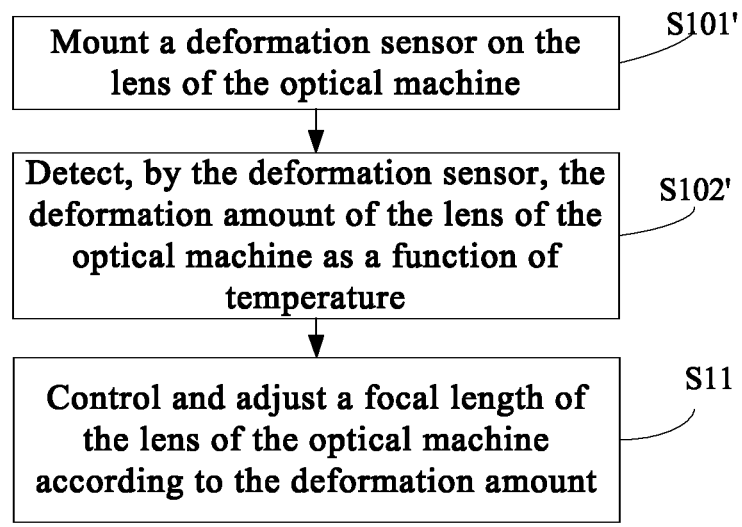
FIG. 4 is a flowchart of a focusing method of an optical machine of a projector according to an embodiment of the present disclosure.

According to an embodiment of the present disclosure, there is provided a focusing method of an optical machine of a projector. Different from the focusing method of the optical machine of the projector according to the above embodiment, as shown in FIG. 4, Step S10 of detecting the deformation amount of the lens of the optical machine includes:

Step S101': mounting a deformation sensor on the lens of the optical machine; and Step S102': detecting, by the deformation sensor, the deformation amount of the lens of the optical machine as a function of temperature.

The other steps of the focusing method according to this embodiment are the same as those in the embodiment as set forth above, and the detailed description thereof will be omitted herein.

According to the present embodiment, in the process of detecting the deformation amount of the lens of the optical machine, the deformation amount of the deformation sensor itself is no longer compensated. Compared with the method for alleviating the defocusing of the lens of the optical machine in the prior art, the focusing method according to this embodiment can also improve the adjustment accuracy of the focal length of the lens of the optical machine, thereby alleviating the defocusing of the lens of optical machine due to the deformation of the lens of the optical machine caused by the thermal expansion and contraction and then increasing the projection resolution of the optical machine of the projector.

Figure 5:
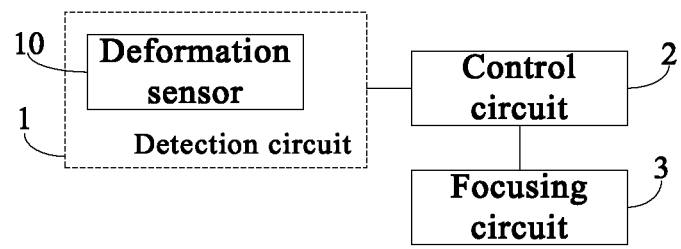
FIG. 5 is a block diagram of a focusing device of an optical machine of a projector according to an embodiment of the present disclosure.

An embodiment of the present disclosure also provides a focusing device. Different from the focusing device according to the above embodiment, as shown in FIG. 5, the detection circuit 1 includes only a deformation sensor 10 which is disposed on the lens of optical machine for detecting the deformation amount of the lens of optical machine as a function of temperature.

The other circuits of the focusing device according to this embodiment are the same as those in the embodiment as set forth above, and the detailed description will be omitted herein.

Any one of the above-described embodiments of the present disclosure can have the following advantageous effects. In the focusing method and focusing device of the optical machine of the projector according to the embodiments of the present disclosure, by detecting the deformation amount of the lens of the optical machine in real time and controlling to adjust the focal length of the lens of the optical machine in real time according to the deformation amount of the lens of the optical machine, the adjustment precision of the focal length of the lens of the optical machine can be greatly improved. Therefore, it is possible to significantly reduce the defocusing of the lens of the optical machine due to the deformation of the lens of the optical machine caused by the thermal expansion and contraction, and further improve the projection resolution of the optical machine of the projector. At the same time, since the housing and lens material of the optical machine of the projector are not changed, the material cost of the optical machine of the projector can also be reduced by the focusing method according to the embodiment of the present disclosure.

An embodiment of the present disclosure also provides an optical machine of a projector, including the focusing device according to any one of the above-described embodiments.

By adopting the focusing device according to any one of the above embodiments, the adjustment accuracy of the focal length of the optical machine of the projector can be improved, thereby reducing the defocusing of the lens of the optical machine due to the deformation of the lens of the optical machine caused by thermal expansion and contraction and improving the projection resolution of the optical machine of the projector.

It can be understood that the above embodiments are merely exemplary embodiments provided for the illustration of the principle of the present disclosure, but the present disclosure is not limited thereto. For a person of ordinary skill in the art, various variations and improvements may be made without departing from the spirit and essence of the present disclosure. These variations and improvements are also considered to be within the protection scope of the present disclosure.

What is claimed is:

1. A focusing method of an optical machine of a projector, comprising steps of:

attaching a deformation sensor on a light exit surface of a lens of the optical machine to detect a deformation amount of the lens of the optical machine; and controlling and adjusting a focal length of the lens of the optical machine according to the deformation amount of the lens of the optical machine, wherein the step of attaching the deformation sensor on the light exit surface of the lens of the optical machine to detect the deformation amount of the lens of the optical machine comprises:

detecting, by the deformation sensor, a first deformation amount of the lens of the optical machine as a function of temperature;

detecting a second deformation amount of the deformation sensor as a function of temperature; and calculating the deformation amount of the lens of the optical machine according to the first deformation amount and the second deformation amount, wherein the deformation amount of the lens of the optical machine is equal to the first deformation amount minus the second deformation amount, and wherein the step of detecting a second deformation amount of the deformation sensor as a function of temperature comprises:

mounting a temperature sensor on the lens of the optical machine;

detecting, by the temperature sensor, a temperature change of the deformation sensor; and determining the second deformation amount of the deformation sensor based on the temperature change.

2. The focusing method according to claim 1, wherein the deformation sensor includes a piezoelectric film sensor and the temperature sensor includes a thermocouple sensor.

3. A focusing device of an optical machine, comprising a detection circuit, a control circuit, and a focusing circuit, wherein the detection circuit comprises a deformation sensor which is attached on a light exit surface of a lens of the optical machine and which is configured to detect a deformation amount of the lens of the optical machine;

the control circuit is configured to control the focusing circuit to adjust a focal length of the lens of the optical machine according to the deformation amount of the lens of the optical machine; and the focusing circuit is configured to adjust the focal length of the lens of the optical machine, the detection circuit further comprises a first detection sub-circuit disposed on the lens of the optical machine, and a calculation sub-circuit, wherein the deformation sensor is configured to detect a first deformation amount of the lens of the optical machine as a function of temperature:

the first detection sub-circuit includes a temperature sensor and is configured to detect a second deformation amount of the deformation sensor as a function of temperature; and the calculation sub-circuit is configured to calculate the deformation amount of the lens of the optical machine according to the first deformation amount and the second deformation amount, wherein the deformation amount of the lens of the optical machine is equal to the first deformation amount minus the second deformation amount.

4. The focusing device according to claim 3, wherein the deformation sensor includes a piezoelectric film sensor; the temperature sensor includes a thermocouple sensor; and the focusing circuit includes a focusing motor that adjusts the focal length of the lens of the optical machine by adjusting a rotational direction and a rotational speed of the focusing motor.

5. An optical machine, comprising the focusing device according to claim 3.

6. The optical machine according to claim 5, wherein the deformation sensor is configured to detect the deformation amount of the lens of the optical machine as a function of temperature.

7. The optical machine according to claim 5, wherein the deformation sensor includes a piezoelectric film sensor; the temperature sensor includes a thermocouple sensor; and the focusing circuit includes a focusing motor that adjusts the focal length of the lens of the optical machine by adjusting a rotational direction and a rotational speed of the focusing motor.

* * * * *